United States Patent
Evans et al.

(10) Patent No.: US 10,230,125 B2
(45) Date of Patent: Mar. 12, 2019

(54) METHOD AND SYSTEM TO MAINTAIN ELECTROLYTE STABILITY FOR ALL-IRON REDOX FLOW BATTERIES

(71) Applicant: ESS TECH, INC., Portland, OR (US)

(72) Inventors: Craig E. Evans, West Linn, OR (US); Yang Song, West Linn, OR (US)

(73) Assignee: ESS Tech, Inc., Wilsonville, OR (US)

(*) Notice: Subject to any disclaimer, the term of this patent is extended or adjusted under 35 U.S.C. 154(b) by 918 days.

(21) Appl. No.: 14/588,225

(22) Filed: Dec. 31, 2014

(65) Prior Publication Data

US 2015/0255824 A1  Sep. 10, 2015

Related U.S. Application Data

(60) Provisional application No. 61/949,040, filed on Mar. 6, 2014.

(51) Int. Cl.
*H01M 8/18* (2006.01)

(52) U.S. Cl.
CPC ........... *H01M 8/188* (2013.01); *H01M 8/184* (2013.01); *Y02E 60/528* (2013.01)

(58) Field of Classification Search
None
See application file for complete search history.

(56) References Cited

U.S. PATENT DOCUMENTS

| | | | |
|---|---|---|---|
| 4,159,366 | A | 6/1979 | Thaller |
| 5,439,757 | A | 8/1995 | Zito |
| 7,517,608 | B2 | 4/2009 | Brereton et al. |
| 2013/0084482 | A1 | 4/2013 | Chang et al. |
| 2014/0272483 | A1 | 9/2014 | Pham et al. |

FOREIGN PATENT DOCUMENTS

WO  2012167057 A2  12/2012

OTHER PUBLICATIONS

ISA Korean Patent Office, International Search Report and Written Opinion Issued in Application No. PCT/US2015/017690, dated May 29, 2015, WIPO, 15 pages.

*Primary Examiner* — Sarah A. Slifka
(74) *Attorney, Agent, or Firm* — McCoy Russell LLP

(57) ABSTRACT

Methods and systems are provided which maintain the positive and negative electrolyte pH and stability of a redox flow battery through the use of electrochemical rebalancing cells. The electrochemical cells may be activated by applying an electrical load to affect changes to the pH of the electrolytes. The use of the electrochemical cells improves long term performance stability redox flow batteries by decreasing and/or eliminating $Fe(OH)_3$ precipitation formation.

14 Claims, 11 Drawing Sheets

METHOD AND SYSTEM TO MAINTAIN ELECTROLYTE STABILITY FOR ALL-IRON REDOX FLOW BATTERIES

CROSS-REFERENCE TO RELATED APPLICATIONS

The present application claims priority to U.S. Provisional Patent Application No. 61/949,040, entitled "METHOD AND SYSTEM TO MAINTAIN ELECTROLYTE STABILITY FOR ALL-IRON REDOX FLOW BATTERIES," filed Mar. 6, 2014, the entire contents of which are hereby incorporated by reference for all purposes.

ACKNOWLEDGMENT OF GOVERNMENT SUPPORT

This invention was made with government support under contract no. DE-AR0000261 awarded by the DOE, Office of ARPA-E. The government has certain rights in the invention.

FIELD OF THE INVENTION

This application relates to materials and methods for redox flow batteries.

BACKGROUND AND SUMMARY

The reduction-oxidation (redox) flow battery is an electrochemical storage device that stores energy in a chemical form and converts the stored chemical energy to an electrical form via spontaneous reverse redox reactions. The reaction in a flow battery is reversible, so conversely, the dispensed chemical energy can be restored by the application of an electrical current inducing the reversed redox reactions. Hybrid flow batteries are distinguished by the deposit of one or more of the electro-active materials as a solid layer on an electrode. Hybrid batteries may, for instance, include a chemical that forms a solid precipitate plate on a substrate at some point throughout the charge reaction and may be dissolved by the electrolyte throughout discharge. During charge, the chemical may solidify on the surface of a substrate forming a plate near the electrode surface. Regularly, this solidified compound is metallic. In hybrid battery systems, the energy stored by the redox battery may be limited by the amount of metal plated during charge and may accordingly be determined by the efficiency of the plating system as well as the available volume and surface area to plate.

One example of a hybrid redox flow battery is an all-iron redox flow battery (IFB), which uses iron as an electrolyte for reactions wherein on the negative electrode, $Fe^{2+}$ receives two electrons and deposits as iron metal during charge and iron metal loses two electrons and re-dissolves as $Fe^{2+}$ during discharge, as shown in equation (1). On the positive electrode, two $Fe^{2+}$ lose two electrons to form $Fe^{3+}$ during charge and during discharge two $Fe^{3+}$ gains two electrons to form $Fe^{2+}$, as shown in equation (2):

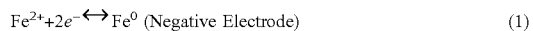

$Fe^{2+}+2e^- \leftrightarrow Fe^0$ (Negative Electrode)  (1)

$2Fe^{2+} \leftrightarrow 2Fe^{3+}+2e^-$ (Positive Electrode)  (2)

On the negative electrode of an IFB, the ferrous iron reduction reaction competes with two side reactions: the reduction of hydrogen protons $H^+$ (reaction (3)), wherein two hydrogen protons each accept a single electron to form hydrogen gas, $H_2$, and the corrosion of deposited iron metal to produce ferrous ion $Fe^{2+}$ (reaction (4)), respectively:

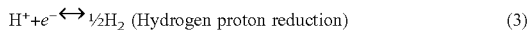

$H^+ + e^- \leftrightarrow \frac{1}{2}H_2$ (Hydrogen proton reduction)  (3)

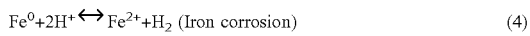

$Fe^0 + 2H^+ \leftrightarrow Fe^{2+} + H_2$ (Iron corrosion)  (4)

These two side reactions reduce the overall battery efficiency, because electrons transferred to the negative electrode are consumed by hydrogen production rather than by iron plating. Furthermore, these side reactions result in imbalanced electrolytes, which may cause battery capacity loss over time.

To minimize these side reactions, it is preferable to maintain the negative electrolyte of an IFB within a pH range of 3 and 4, where the ferrous ion ($Fe^{2+}$) in the negative electrolyte remains stable and the rates of reactions (3) and (4) are slow. In the positive electrolyte, however, ferric ion ($Fe^{3+}$) is only stable at pH less than 2. Indeed, to minimize ferric hydroxide, which is non-conductive and hinders reaction (2), and further to promote redox reaction kinetics, a pH value of around 1 is desired for the positive electrolyte.

Ionic movements of $H^+$ and $Fe^{3+}$ across the membrane barrier separating the electrolytes can be deleterious to the performance of an IFB battery. These ionic movements are driven by diffusion, migration and convection. As $H^+$ crosses from the positive electrolyte to the negative electrolyte during battery charge, the pH of the positive electrolyte rises. When the pH of the positive electrolyte is 2 or above, $Fe^{3+}$ in the positive electrolyte precipitates as $Fe(OH)_3$. Furthermore, when $Fe^{3+}$ crosses over from the positive electrolyte (more acidic) to the negative electrolyte (less acidic), $Fe(OH)_3$ can also form in the negative electrode and/or on the membrane separator. This $Fe(OH)_3$ formation is the root cause of electrolyte instability and poor cycle performance of an IFB battery, because the $Fe(OH)_3$ precipitate can increase membrane separator resistance by fouling the organic functional group of an ion exchange membrane or clogging the small pores of the micro-porous membrane. Further, the $Fe(OH)_3$ precipitate is non-conductive, so once it precipitates on electrode surfaces, it degrades electrode performance.

Thus, long term performance stability of an IFB battery may be increased by eliminating $Fe(OH)_3$ precipitation formation. The formation of the $Fe(OH)_3$ precipitate on the positive side may be eliminated by maintaining the pH of the positive electrolyte around 1 and the formation of the $Fe(OH)_3$ precipitate on the negative side may be eliminated by reducing crossed-over $Fe^{3+}$ to $Fe^{2+}$, which is stable in a pH range from 3 to 4. To accomplish both objectives, an electrochemical cell may be implemented, wherein hydrogen gas evolved from the IFB battery negative electrode (reaction (3) and (4)) flows through the electrochemical cell anode and the positive/negative electrolytes of the IFB battery flow through the electrochemical cell cathode. The electrochemical cell anode and cathode may be electrically connected, such that the electrochemical reactions occurring at the anode and cathode of the electrochemical cell convert gaseous hydrogen back to protons in order to maintain electrolyte pH and consume the crossed-over $Fe^{3+}$ to $Fe^{2+}$, which may thus result in clean and stable IFB electrolytes.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The present description relates to methods and systems for redox flow batteries. The methods and systems provided maintain electrolyte stability through pH and species control in the redox flow battery system. Redox flow battery systems, illustrated in FIG. 1, utilize a reversible chemical reaction to store and release energy. An example of a redox flow battery is an all-iron hybrid redox flow battery (IFB) which utilizes electrochemical reactions involving iron ions, illustrated in FIGS. 2A, 2B, and 3. During operation of redox flow battery systems, side reactions may be present which affect the operation parameters of the battery and may decrease the efficiency of the system. An electrochemical cell, herein also referred to as a rebalancing cell, illustrated in FIG. 4, may be included in a redox flow battery system, illustrated in FIGS. 5, 6, and 7. The electrochemical cell may be used during specific conditions within a redox flow battery system, illustrated in FIG. 10, to maintain the pH of the electrolytes within a desired range, as outlined in FIGS. 8 and 9. The description primarily describes an IFB as an example redox flow battery system.

Figure 1:
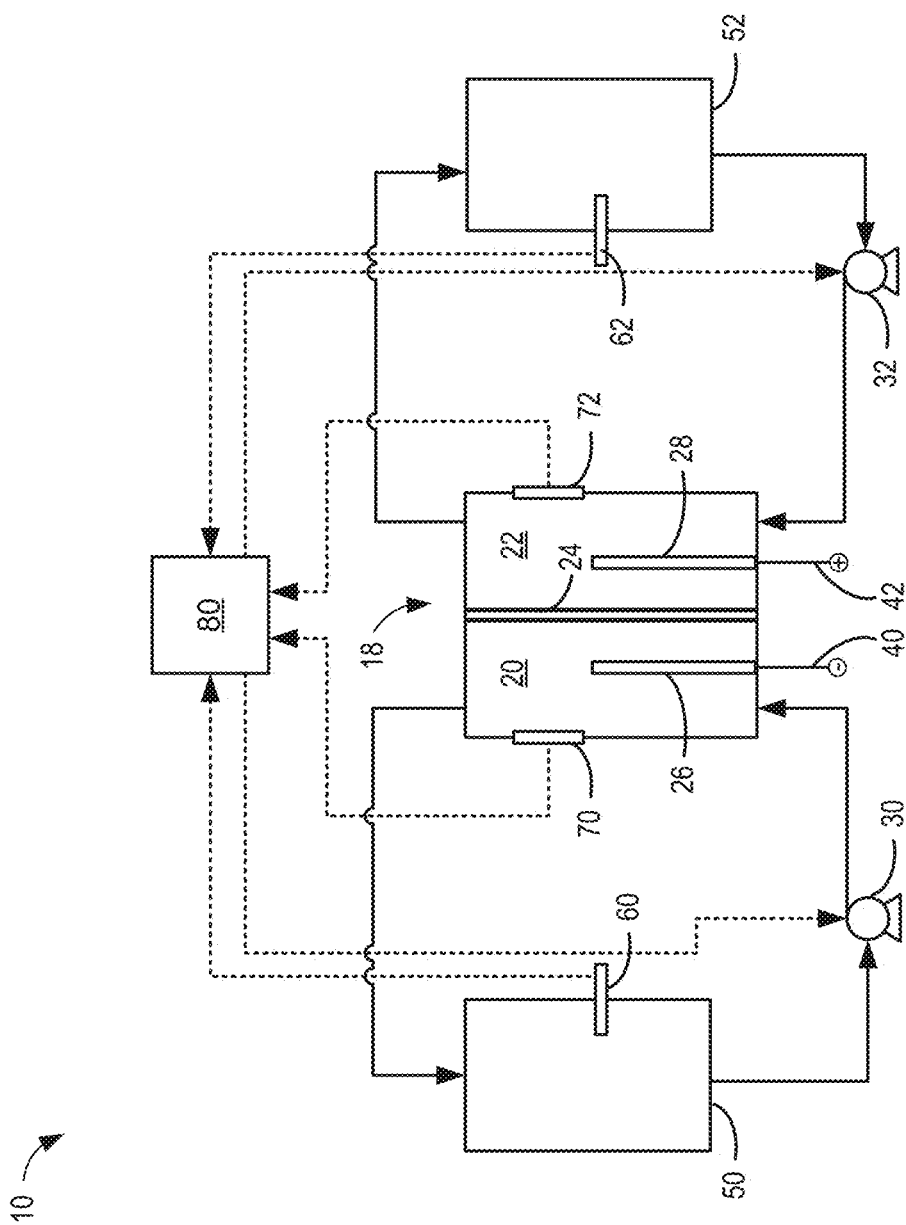
FIG. 1 is a schematic of an example of a redox flow battery.

Turning to FIG. 1, an example schematic is provided for a redox flow battery. A single redox flow battery cell 18 is illustrated wherein the system for a hybrid flow battery generally comprises a negative electrode compartment 20, a positive electrode compartment 22, and a membrane separator 24 disposed between the negative electrode compartment and the positive electrode compartment. In some examples, multiple cells 18 may be combined in series and/or in parallel to provide a higher voltage and/or current in the redox flow battery system.

The negative electrode compartment 20 may comprise a negative electrode 26 and a second electrolyte, also referred to as a negative electrode electrolyte, wherein the second electrolyte comprises electro-active materials.

The positive electrode compartment 22 may comprise a positive electrode 28 and a first electrolyte, also referred to as a positive electrode electrolyte, wherein the first electrolyte comprises electro-active materials.

The separator 24 may comprise an electrically insulating ionic conducting barrier which prevents bulk mixing of the first electrolyte and the second electrolyte while allowing conductance of specific ions there through. In one example, separator 24 may comprise an ion-exchange membrane. In another example, separator 24 may comprise a microporous membrane.

Electrolytes are typically stored in tanks external to the cell, and are pumped via pumps 30 and 32 through the negative electrode compartment 20 side and the positive electrode compartment 22 side of the battery, respectively. In the example of FIG. 1, the second electrolyte is stored at a second electrolyte source 50, which may comprise an external second electrolyte tank, and the first electrolyte is stored at a first electrolyte source 52, which may comprise an external first electrolyte tank.

The operation of a redox flow battery system 10 in reference to FIG. 1 is now described. When a charge current is applied to the battery terminals 40 and 42, the positive electrolyte is oxidized (lose one or more electrons) at positive electrode 28, and the negative electrolyte is reduced (gain one or more electrons) at negative electrode 26. During battery discharge, reverse redox reactions occur on the electrodes. In other words, the positive electrolyte is reduced (gain one or more electrons) at the positive electrode 28, and the negative electrolyte is oxidized (lose one or more electrons) at the negative electrode 26. The electrical potential difference across the battery is maintained by the electrochemical redox reactions in the positive electrode compartment 22 and the negative electrode compartment 20, and can induce a current through a conductor while the reactions are sustained. The amount of energy stored by a redox battery is limited by the amount of electro-active material available in the electrolytes for discharge. The amount of available electro-active material is based on the total volume of electrolytes and the solubility of the electro-active materials.

During operation of a redox flow battery system, sensors and probes may monitor and control chemical properties of the electrolyte such as electrolyte pH, concentration, state of charge, and the like. For example, sensors 60 and 62 may be positioned to monitor electrolyte conditions at negative electrolyte source 50 and positive electrolyte source 52, respectively. As another example, sensors 70 and 72 may monitor electrolyte conditions at the negative electrode compartment 20 and the positive electrode compartment 22, respectively. Sensors may be positioned at other locations throughout the redox flow battery system to monitor electrolyte chemical properties and other properties. Sensor information may be transmitted to a controller 80 which may in turn actuate pumps 30 and 32 to control electrolytes' flow through the cell 18, for example, and/or to perform other control functions. In this manner, the controller 80 may be responsive to one or more of the sensors and probes, or any such combination thereof.

Hybrid flow batteries are redox flow batteries that are characterized by the deposit of one or more of the electroactive materials as a solid layer on an electrode. In hybrid flow battery systems, the charge capacity (e.g., amount of energy stored) of the redox battery may be limited by the amount of metal plated during battery charge and may accordingly depend on the efficiency of the plating system as well as the available volume and surface area available for plating.

In a hybrid flow battery system, the negative electrode 26 may be referred to as the plating electrode and the positive electrode 28 may be referred to as the redox electrode. The negative electrolyte within the plating side (e.g., negative electrode compartment 20) of the battery may be referred to as the plating electrolyte and the positive electrolyte on the redox side (e.g. positive electrode compartment 22) of the battery may be referred to as the redox electrolyte.

The term "anode" refers to the electrode where electro-active material loses electrons. Similarly, the term "cathode" refers to the electrode where electro-active material gains electrons. During battery charge, the second electrolyte gains electrons at the negative electrode 26, therefore the negative electrode 26 is the cathode of the electrochemical reaction. During discharge, the second electrolyte loses electrons; therefore, the negative electrode 26 is the anode of the reaction. Accordingly, during charge, the plating electrolyte and plating electrode may be respectively referred to as the catholyte and cathode of the electrochemical reaction, while the redox electrolyte and the redox electrode may be respectively referred to as the anolyte and anode of the electrochemical reaction. Alternatively, during discharge, the plating electrolyte and plating electrode may be respectively referred to as the anolyte and anode of the electrochemical reaction, while the redox electrolyte and the redox electrode may be respectively referred to as the catholyte and cathode of the electrochemical reaction.

Figure 2A:
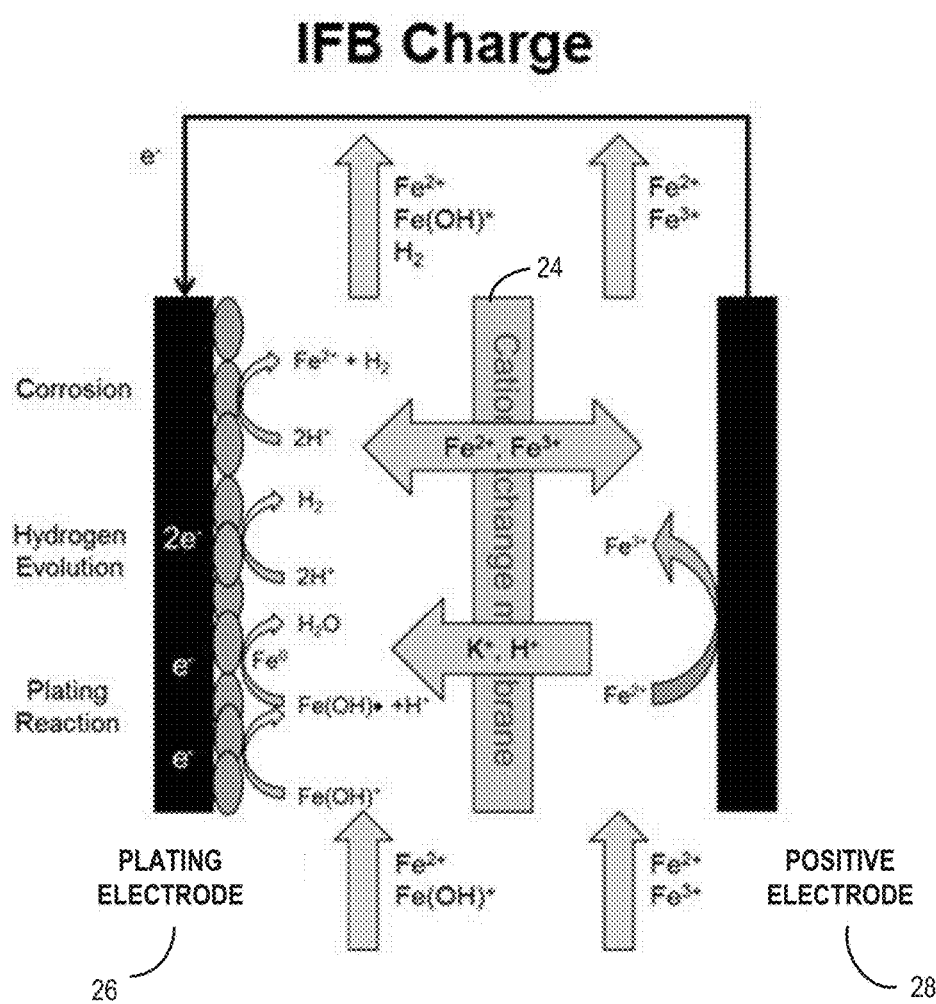
FIG. 2A is a schematic of an example of electrode reactions and ionic movements of an all-iron hybrid redox flow battery during charge.
Figure 2B:
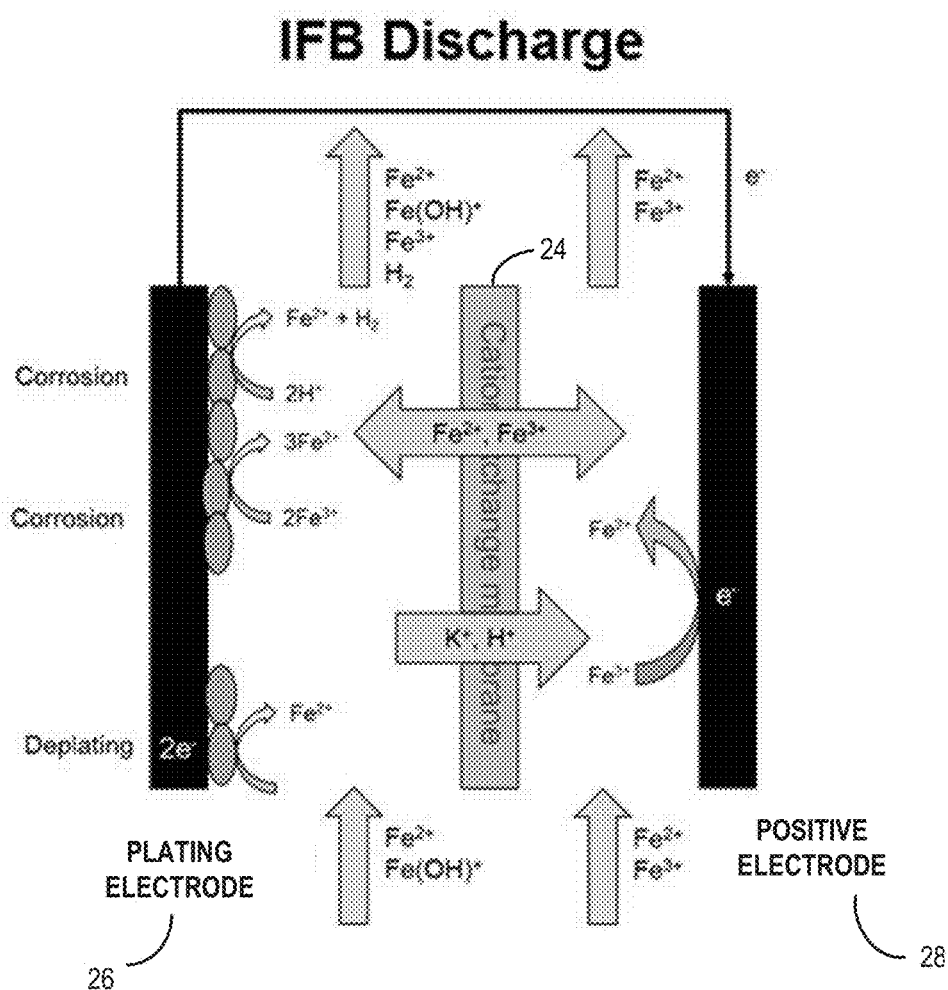
FIG. 2B is a schematic of an example of electrode reactions and ionic movements of an all-iron hybrid redox flow battery during discharge.

One example of a hybrid redox flow battery is an all-iron redox flow battery (IFB), illustrated in FIGS. 2A and 2B, in which the electrolytes comprise iron ions in the form of iron salts (e.g., $FeCl_2$, $FeCl_3$, and the like), wherein the plating electrode comprises metal iron. The example IFB illustrated comprises a cation exchange membrane as the separator. In other examples, the separator may include a different material. Illustrated in FIG. 2A, at the plating electrode, ferrous ion, $Fe^{2+}$, receives two electrons and plates as iron metal on to the negative electrode 26 during battery charge. Illustrated in FIG. 2B, iron metal, $Fe^0$, loses two electrons and re-dissolves as $Fe^{2+}$ during battery discharge.

At the positive electrode, $Fe^{2+}$ loses an electron to form ferric ion, $Fe^{3+}$, during charge, and during discharge, $Fe^{3+}$ gains an electron to form $Fe^{2+}$. The electrochemical reaction may be summarized by equations (1) and (2) below, wherein the forward reactions (left to right) indicate electrochemical reactions during battery charge, while the reverse reactions (right to left) indicate electrochemical reactions during battery discharge:

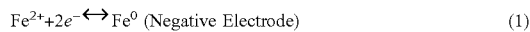

$$Fe^{2+}+2e^- \leftrightarrow Fe^0 \text{ (Negative Electrode)} \qquad (1)$$

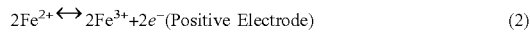

$$2Fe^{2+} \leftrightarrow 2Fe^{3+}+2e^- \text{(Positive Electrode)} \qquad (2)$$

As discussed above, the plating electrolyte used in the all-iron redox flow battery (IFB) may provide a sufficient amount of $Fe^{2+}$ so that, during charge, $Fe^{2+}$ can accept two electrons from the negative electrode to form $Fe^0$ and plate onto a substrate. During discharge, the plated $Fe^0$ may then lose two electrons, ionizing into $Fe^{2+}$ and be dissolved back into the electrolyte. The equilibrium potential of the above reaction is −0.44V and thus this reaction provides a negative terminal for the desired system. On the redox side of the IFB, the electrolyte may provide $Fe^{2+}$ during charge which loses an electron and oxidizes to $Fe^{3+}$. During discharge, $Fe^{3+}$ provided by the electrolyte becomes $Fe^{2+}$ by absorbing an electron provided by the electrode. The equilibrium potential of this reaction is +0.77V, creating a positive terminal for the desired system.

The IFB provides the ability to charge and recharge its electrolytes in contrast to other battery types utilizing non-regenerating electrolytes. Referring back to FIG. 1, charge may be achieved by applying a current across the electrodes via battery terminals 40 and 42. The plating electrode may be coupled via terminal 40 to the negative side of a voltage source so that electrons may be delivered to the plating electrolyte via the redox electrode (e.g., as $Fe^{2+}$ is oxidized to $Fe^{3+}$ in the first electrolyte in the positive electrode compartment 22). The electrons provided to the negative electrode 26 (e.g., plating electrode) can reduce the $Fe^{2+}$ in the negative electrolyte to form $Fe^0$ at the plating substrate causing it to plate onto the electrode.

Discharge can be sustained while $Fe^0$ remains available in the plating electrolyte for oxidation and while $Fe^{3+}$ remains available in the redox electrolyte for reduction. As an example, $Fe^{3+}$ availability can be maintained by increasing the concentration or the volume of the positive electrolyte to the positive electrode compartment 22 side of cell 18 to provide additional $Fe^{3+}$ ions via an external source, such as an external electrolyte tank 52. More commonly, availability of $Fe^0$ during discharge may be an issue in IFB systems, wherein the $Fe^0$ available for discharge may be proportional to the surface area and volume of the plating electrode substrate as well as the plating efficiency. Charge capacity may be dependent on the availability of $Fe^{2+}$ in the negative electrode compartment 20. As an example, $Fe^{2+}$ availability can be maintained by increasing the concentration or the volume of the plating electrolyte to the negative electrode compartment 20 side of cell 18 to provide additional $Fe^{2+}$ ions via an external source, such as an external electrolyte tank 50.

In an IFB, the positive electrolyte comprises ferrous ion and/or ferric ion, while the negative electrolyte comprises ferrous ion, depending on the state of charge of the IFB system. As previously mentioned, utilization of iron ions in both the negative and positive electrolytes allows for utilization of the same electrolytic species on both sides of the battery cell, which can reduce electrolyte cross-contamination and can increase the efficiency of the IFB system, resulting in less electrolyte replacement as compared to other redox flow battery systems.

The general mass balance for a diluted species present in an electrolyte may be described by equation (5) below for each species i:

$$\frac{\partial c_i}{\partial t} + \nabla \cdot N_i = R_{i,tot} \qquad (5)$$

Where $N_i$ is the flux of species i with units of mol/m²s. The flux in an electrolyte may be described by the Nernst-Planck equations which accounts for the flux of the charged solute species, i.e. the ions present, by diffusion, migration, and convection and are represented by the first, second, and third term on the right hand side of equation (6) below:

$$N_i = -D_i \nabla c_i - z_i u_{m,i} F \nabla \varphi_i + c_i u \qquad (6)$$

Where $c_i$ represents the concentration, $z_i$ is the valence, $D_i$ is the diffusion coefficient, $u_{m,i}$ is the mobility, F is Faraday constant, $\varphi_i$ is the electrolyte potential, and $\mu$ is the velocity vector of the ion i in the electrolyte.

In an IFB battery electrolyte, besides the electrochemically active $Fe^{2+}$ and $Fe^{3+}$ ions, a conductive salt, such as KCl, is present to reduce the battery electrolyte ohmic resistance. Both of the $Fe^{2+}$ and $Fe^{3+}$ dissociate with the $H_2O$ to generate $Fe(OH)_x$ complexes and $H^+$. These charged species within the electrolyte complete the electrochemical current flow during battery operation through ionic movements by diffusion, migration and convection.

For example, in an IFB battery that applies a cation-exchange membrane, such as the one illustrated in FIGS. 2A and 2B, cations, such as $K^+$, $H^+$, $Fe^{2+}$, and $Fe^{3+}$, are driven towards the negative electrode during battery charge operation. During battery discharge operation, the cations are driven towards the positive electrode.

Figure 3:
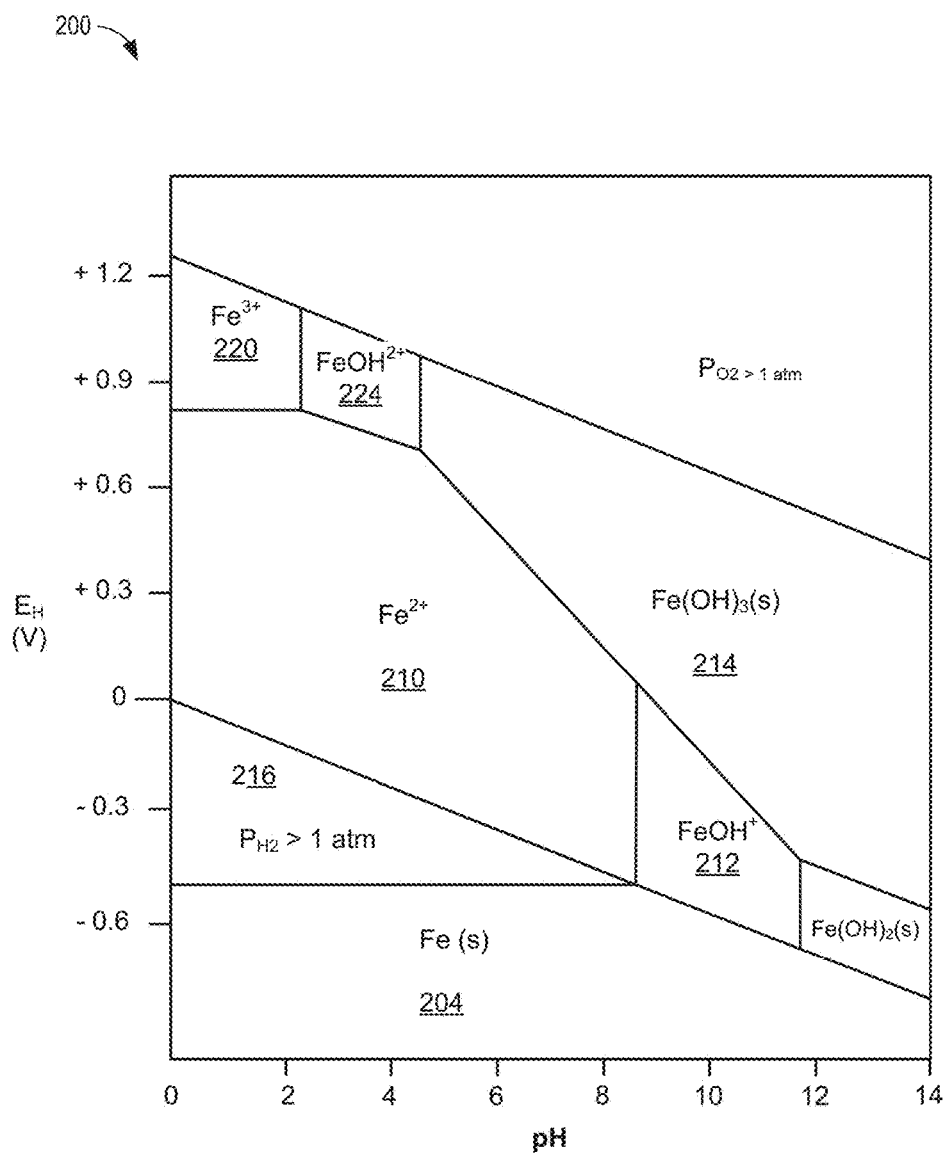
FIG. 3 is an example Pourbaix diagram for iron.

Turning now to FIG. 3, an example of a Pourbaix diagram is illustrated. A Pourbaix diagram maps out possible stable equilibrium phases of an aqueous electrochemical system. The various solid lines in the Pourbaix diagram of FIG. 3 represent equilibrium conditions where the indicated species on either side of the line have the same chemical activity. Inside the regions on either side of the solid lines, the indicated species predominates. In this way, Pourbaix diagrams can illustrate how pH changes can affect electrolyte species and stability in a redox flow battery system such as an IFB, leading to cycling performance losses over time. As an example, FIG. 3 shows a Pourbaix diagram 200 for iron. The vertical axis of FIG. 3 represents the potential with respect to the standard hydrogen electrode, and the horizontal axis represents pH. During the charging of an IFB, for example, ferrous ions $Fe^{2+}$, are reduced (accepting two electrons in a redox reaction) to metal iron, $Fe^0$, at the negative electrode. Simultaneously, at the positive electrode, ferrous ions, $Fe^{2+}$, are oxidized (losing an electron) to ferric ions, $Fe^{3+}$. Concurrently, at the negative electrode, the ferrous iron reduction reaction competes with the reduction of hydrogen protons, $H^+$, wherein two hydrogen protons each accept a single electron to form hydrogen gas, $H_2$, and the corrosion of iron metal to produce ferrous ions ($Fe^{2+}$). The production of hydrogen gas through the reduction of hydrogen protons and the corrosion of iron metal are shown in equations (3) and (4), respectively:

$$H^+ + e^- \leftrightarrow \tfrac{1}{2} H_2 \text{ (Hydrogen proton reduction)} \quad (3)$$

$$Fe^0 + 2H^+ \leftrightarrow Fe^{2+} + H_2 \text{ (Iron corrosion)} \quad (4)$$

As a result, the second electrolyte in the negative electrode compartment 20 tends to stabilize at a pH range between 3 and 4, wherein formation of ferrous hydroxide ion ($FeOH^+$) at 212, precipitation of ferric hydroxide, $Fe(OH)_3$ at 214, and hydrogen evolution at 204 are all reduced. At the positive electrode compartment 22, ferric ion, $Fe^{3+}$, has a much lower acid disassociation constant (pKa) than that of ferrous ion, $Fe^{2+}$. Therefore, as more ferrous ions are oxidized to ferric ions, the electrolyte tends to stabilize at a pH less than 2, in particular at a pH closer to 1 within region 220.

Accordingly, maintaining the positive electrolyte pH in a range in which the positive electrolyte (positive electrode compartment 22) remains stable and maintaining the negative electrolyte pH in a range in which the negative electrolyte (negative electrode compartment 20) remains stable may greatly improve performance and efficiency of IFBs. For example, maintaining a pH of a negative electrolyte between 3 and 4 may reduce iron corrosion and hydrogen evolution reactions and increase iron plating efficiency. Further maintaining a pH of a positive electrolyte less than 2, may promote the ferric/ferrous ion redox reaction and reduce ferric hydroxide formation. In other examples, the pH of the positive electrolyte may be maintained to be less than 1.

Concentration gradients of $H^+$ and $Fe^{3+}$ across the membrane barrier separating the positive and negative electrolytes can cause many issues. Driven by the electrophoretic forces and concentration gradients, $H^+$ crosses from the positive electrolyte to the negative electrolyte during charge and positive electrolyte pH rises. When the pH of positive electrolyte reaches values of 2 and above, $Fe^{3+}$ in the positive electrolyte precipitates as $Fe(OH)_3$. Furthermore, driven by electrophoretic forces and concentration gradients, $Fe^{3+}$ also crosses over from the positive electrolyte (more acidic) to the negative electrolyte (less acidic) during charge. As the result, $Fe(OH)_3$ can form at the negative electrode and/or on the membrane separator. This $Fe(OH)_3$ formation is one of the root causes of electrolyte instability and poor cycle performance of an IFB battery, because the $Fe(OH)_3$ precipitate increases membrane separator resistance by fouling the organic functional group of an ion exchange membrane or clogging the small pores of the micro-porous membrane. Besides, the $Fe(OH)_3$ precipitate is non-conductive, so once it precipitates on electrode surfaces, it increases electrode resistance and degrades its performance. Precipitate may be removed by washing the battery with acid, but the constant maintenance and downtime may be disadvantageous for commercial battery applications. Furthermore, washing may be dependent on regular preparation of electrolyte, adding to process cost and complexity. Adding specific organic acids to the first electrolyte and the second electrolyte in response to electrolyte pH changes may also mitigate precipitate formation during battery charge and discharge cycling by forming complexes with $Fe^{3+}$, but $Fe^{3+}$ complex formation may reduce overall IFB battery efficiency.

Additional IFB battery capacity loss may be caused by reduced plating capacity, either due to electrons consumed by the hydrogen evolution reaction (equation 3) or due to plated iron corroded by $H^+$ to form $H_2$. Both these side reactions may cause formation of hydrogen gassing at the negative side (e.g., negative electrode compartment 20) of the battery during charge. And because of lost capacitance on the negative side, more ferric ions are available on the positive side of the battery and therefore cause imbalanced amount of ferric ions to form.

One approach that addresses both pH difference between electrolytes and electrolyte stability issues thereof comprises an electrochemical cell, where hydrogen gas evolved from the IFB battery negative electrode flows through the electrochemical cell anode and positive/negative electrolyte of the IFB battery flows through the electrochemical cell cathode. The electrochemical cell anode and cathode are electrically connected, so the electrochemical reactions occurring at the anode and cathode of the electrochemical cell convert gaseous hydrogen back to protons to maintain electrolyte pH and consume the crossed-over $Fe^{3+}$ to $Fe^{2+}$, which reduces $Fe(OH)_3$ formation and results in clean and stable IFB electrolytes over many charge/discharge cycles.

The anode and cathode reactions of this electrochemical cell are shown in reaction (7) and (8), respectively:

$$\tfrac{1}{2} H_2 - e \xrightarrow{\text{Catalyst}} H^+ \quad (7)$$

(electrochemical anode)

$$Fe^{3+} + e \xrightarrow{\text{Carbon}} Fe^{2+} \quad (8)$$

(electrochemical cathode)

Although equation (8) is written for rebalancing electrolytes in an IFB system, the method of reducing an electrolyte with hydrogen gas through an electrochemical cell may be generalized by equation (9):

$$M^{x+} + e \rightarrow M^{z+} \quad (9)$$

In equation (9), $M^{x+}$ represents the positive electrolyte M having ionic charge, x, $M^{z+}$ represents the reduced electrolyte M having ionic charge, z.

Figure 4:
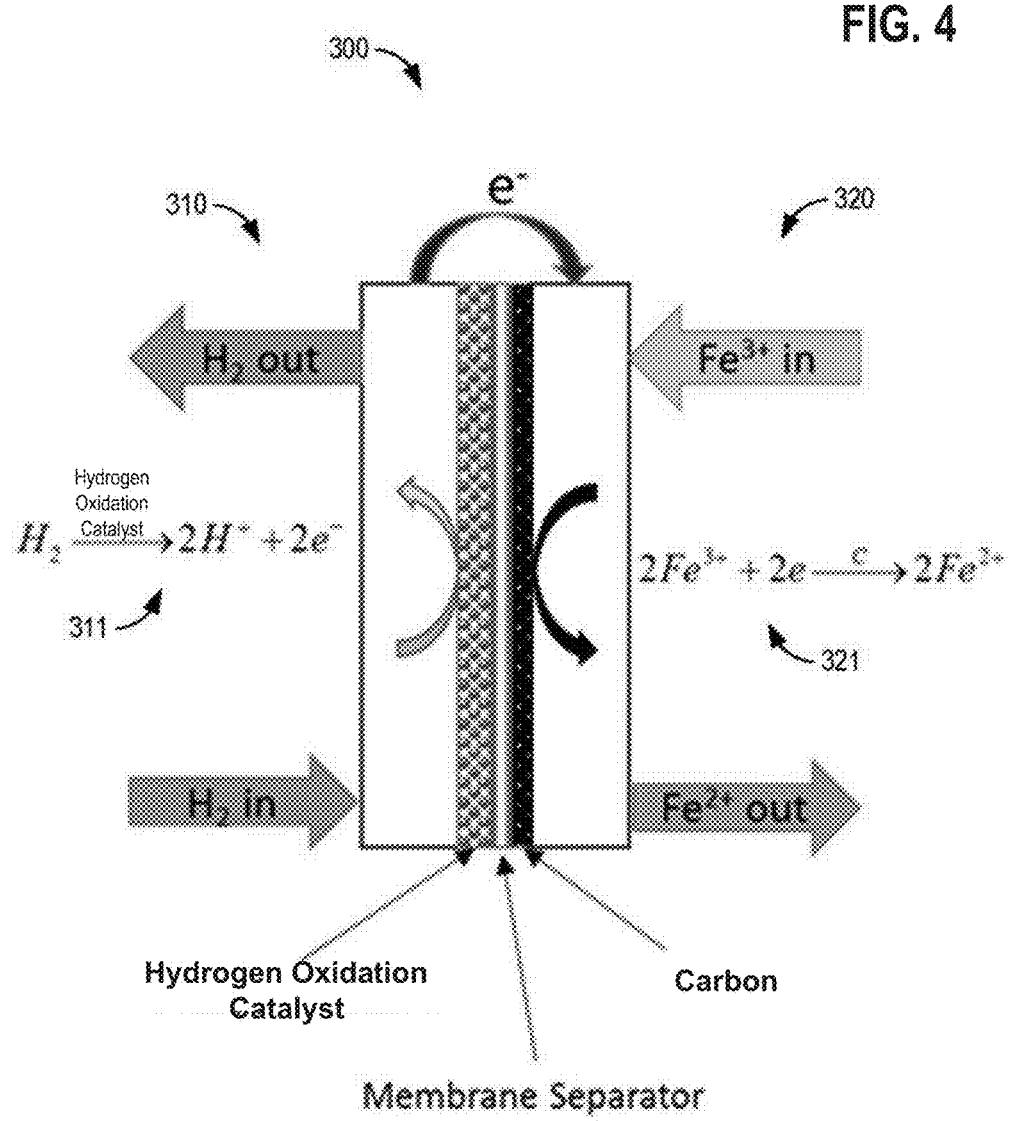
FIG. 4 is a schematic of the proposed electrochemical system.

FIG. 4 schematically illustrates an example electrochemical cell 300, also referred to as a rebalancing cell, which may be used to maintain the pH and stability of electrolytes for an IFB battery in accordance with equations (7) and (8). Hydrogen ($H_2$), evolved from the negative electrode of the IFB battery, flows through the anode side 310 of the electrochemical cell 300. Therein, electrons are stripped from the hydrogen molecules by a hydrogen oxidation catalyst, thereby producing protons and electrons, as indicated by equation 311. A hydrogen oxidation catalyst may comprise of a small amount (e.g. 0.02 mg/cm$^2$ to >0.2 mg/cm$^2$) of precious metal, such as Pt, Pd, Ru, Rd or their alloys, supported on a conductive carrier, such as carbon. IFB electrolytes containing ferric ions ($Fe^{3+}$) flow through the cathode side 320 of the electrochemical cell 300. Therein, electrons are accepted by the ferric ions on a carbon surface, thereby producing ferrous ions, as indicated by equation 321.

The resulting Gibbs free energy of these two reactions is negative. The reactions therefore occur spontaneously, resulting in the high theoretically electrical efficiency. The energy released from these electrochemical cells may be used to power auxiliary components in the overall IFB system, for example, electronic components, cooling fans, and/or indication lights, thus improving overall system efficiency. The energy, i.e. voltage, generated through the application of an electrical load to the electrochemical cell may be stored in a system power bus.

Figure 5:
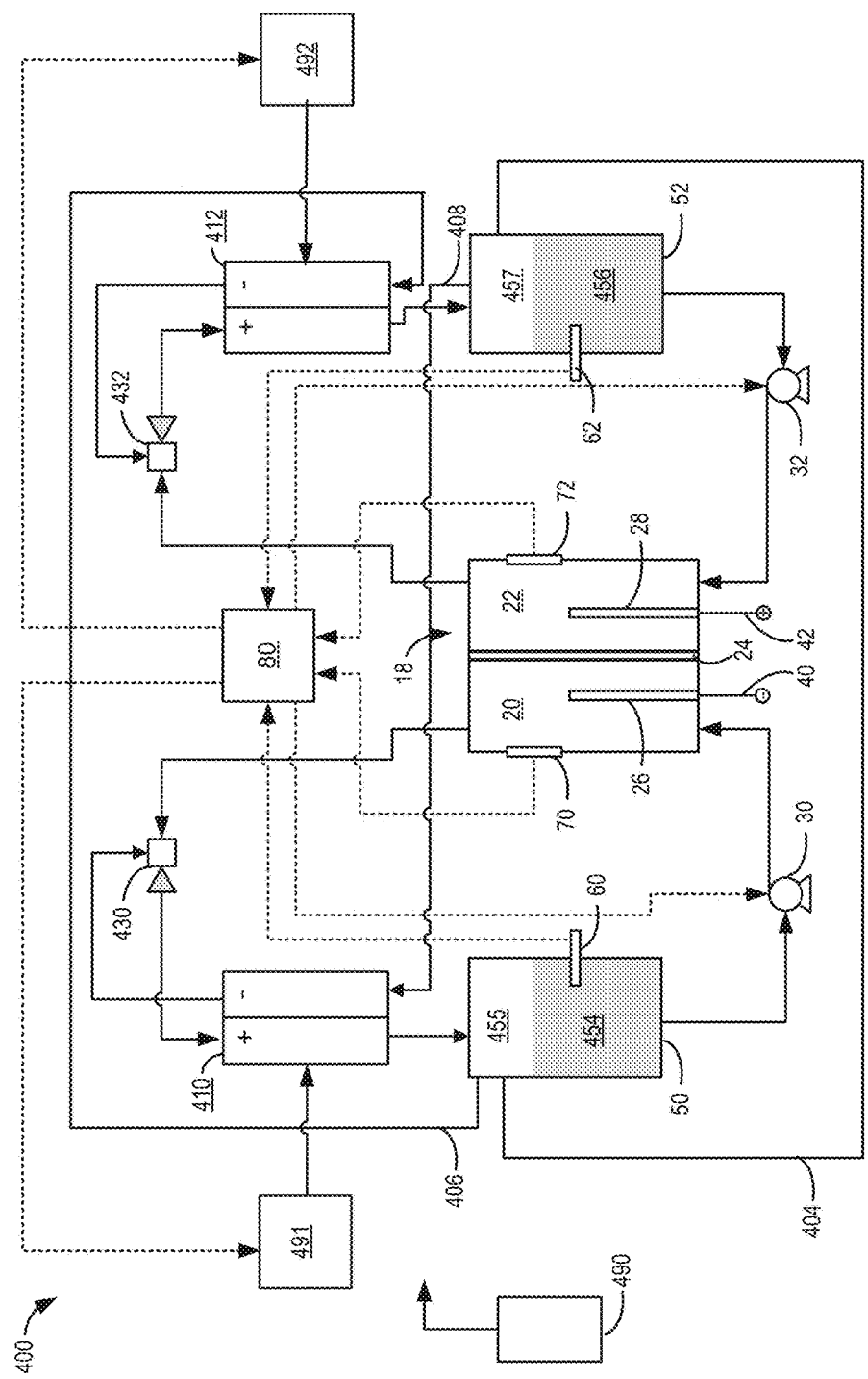
FIG. 5 is a schematic showing an example apparatus for the proposed electrochemical system in a redox flow battery system.

Turning now to FIG. 5, a schematic for an example redox flow battery system 400 comprising a redox flow battery cell, such as the one illustrated in FIG. 1, is shown. FIG. 5 includes some of the same elements as the redox flow battery system shown in FIG. 1. Elements in FIG. 5 which correspond to elements in FIG. 1 are labeled with the same numeric identifiers. As such, the description of elements in FIG. 1 applies to the elements in FIG. 5 that have the same numerical identifiers. As shown in FIG. 5, positive electrolyte source 52 and negative electrolyte source 50 may each hold liquid electrolyte such as positive electrolyte 456 and negative electrolyte 454, respectively. As shown in FIG. 5, positive electrolyte 456 may comprise the redox electrolyte that recirculates through the positive electrode compartment 22, and negative electrolyte 454 may comprise a plating electrolyte that recirculates to the negative electrode compartment 20. The positive electrolyte source 52 may be coupled to the positive electrode compartment and contain the positive electrolyte. The negative electrolyte source 50 may be coupled to the negative electrode compartment and contain a negative electrolyte.

In the redox flow battery system 400, the positive electrolyte source 52 and the negative electrolyte source 50 may both be purged with an inert gas, such as Argon, to remove oxygen gas. The purged electrolytes may be pumped via pumps 32 and 30 through the positive and negative sides of the battery, respectively, during battery operation. The positive and negative sides of the battery may refer to the positive electrode compartment 22 and the negative electrode compartment 20. Two electrochemical cells 410 and 412 may be connected in-line, connected in parallel, placed in the electrolyte tanks (50 and 52), or coupled within battery 18, with the recirculating flow paths of the electrolyte at the negative and positive sides of the battery, respectively, in the redox flow battery system 400. In this embodiment, electrochemical cell 410 is a negative electrochemical cell, herein also referred to as a second electrochemical cell, and electrochemical cell 412 is a positive electrochemical cell, herein also referred to as a first electrochemical cell. Thus, the system includes supplying the electrolytes to a cathode of the at least one electrochemical cell.

During battery charge, gaseous hydrogen may be generated on the negative side of the battery (e.g., at negative electrode 26) due to both electrochemical and corrosion side reactions (equations (3), and (4)) as previously described. Equation (4) is written for corrosion of iron metal electrode, for example in an IFB system, however, corrosion of other metals producing hydrogen gas may also occur in other types of hybrid redox flow battery systems or other redox flow battery systems. The hydrogen generated from the electrochemical and corrosion side reactions may accumulate at the negative electrolyte source 50 and diffuse to the positive electrolyte source 52. A pressure equalization line 404 may connect negative electrolyte source 50 and positive electrolyte source 52, thereby equating a pressure between a gas head spaces 457 and 455 of positive and negative electrolyte sources, respectively.

Eductors 430 and 432 are used to circulate hydrogen-rich gas from 455 to 457 and to deliver hydrogen-rich gas to anodes of electrochemical cell 410 and 412. Hydrogen gas accumulated at the head space 455 of negative electrolyte may be circulated through anodes of electrochemical cell 412 through Educator 432 located between the positive electrode compartment 22 of battery cell 18 and electrochemical cell 412, respectively. Hydrogen rich gas is pulled through anodes of electrochemical cell 412 via suctions created by positive electrolyte flowing through Eductor 432. A negative Eductor 430, located between the negative electrode compartment 20 of battery cell 18 and electrochemical cell 410, may also circulate hydrogen rich gas by pulling hydrogen from the head space 457 of positive electrolyte through anode of negative electrochemical cell 410. One or both Eductors 430 and 432 may exist in a system since head space 455 and 457 are connected through 404. With only one eductor in the system, anodes of electrochemical cells 410 and 412 may be connected in series so Hydrogen-rich gas is circulated through both anodes of electrochemical cells.

In one example, the hydrogen gas from the head space of the electrolyte sources may be supplied to anodes of the negative and positive electrochemical cells 410 and 412, while electrolytes are supplied to cathodes of the electrochemical cells 410 and 412. In one example, hydrogen gas from head space 457 is supplied to the anode of the negative electrochemical cell 410 and hydrogen gas from head space 455 is supplied to the anode of the positive electrochemical cell 412. Thus, the system may supply hydrogen gas to an anode of the at least one electrochemical cell.

Eductors 430 and 432 may deliver a predetermined amount or flow rate of hydrogen gas to anodes of electrochemical cells 410 and 412, respectively. Eductor 432 may be connected to the gas head space 455 of negative electrolyte source 50 via line 406 and eductor 430 may be connected to the gas head space 457 of positive electrolyte source 52 via line 408. For example, positive electrolyte flowing from the positive electrode compartment 22 may pass through eductor 432, thereby drawing gas (e.g., hydrogen rich gas) from gas head space 455 of negative electrolyte source 50 through line 406, and/or negative electrolyte flowing from the negative electrode compartment 20 may pass through eductor 430, thereby circulating gas (e.g., hydrogen-rich gas) from gas head space 457 of positive electrolyte source 50 through line 408. The sizes of eductors 430 and 432 may be predetermined based on a predetermined amount of hydrogen generated and a predetermined speed of the reduction reaction. For example, the sizes of eductors 430 and 432 may be increased to increase the hydrogen gas flow to electrochemical cells 410, 412, respectively, relative to the liquid electrolyte flow recirculated by pumps 30, and 32, respectively. In some examples, the sizes of eductors 430, and 432 may be different, the sizes of each eductor predetermined according to the predetermined hydrogen flow rates to electrochemical cells 410 and 412. For example, in an IFB, because the ferric ion concentration may be higher in the redox electrolyte at the positive side of the redox flow battery system, a larger portion of the hydrogen gas may be consumed in electrochemical cell 412. As a further example, the eductors may be sized according to the reaction rate parameters determined as discussed above for equations (7-9) and system conditions such as reaction temperature. As a further example, instead of eductors 430 and 432, mechanical pumps may be used for delivering liquid electrolytes and hydrogen gas to electrochemical cells 410 and 412, respectively, wherein the mechanical pumps may be controlled by controller 80. In some examples, one of the educators may be removed from the system and the anodes of the electrochemical cells may be connected in series. For example, hydrogen gas from the negative tank may be provided to the anode of the negative electrochemical cell and then to the anode of the positive electrochemical cell, which may be connected to an eductor. In other examples, electrochemical cells 410 and 412 may be plumbed in parallel to the electrolyte flow paths in battery 18.

Redox flow battery system 400 may further comprise an external source 490 of hydrogen gas. External source 490 may supply additional hydrogen gas to the positive electrolyte source 52 and to the negative electrolyte source 50. External source 490 may alternately supply additional hydrogen gas to the inlet of electrochemical cells 410 and 412, for example at the anodes of the electrochemical cells. As an example, a mass flow meter or other flow controlling device (which may be controlled by controller 80) may regulate the flow of the hydrogen gas from external source 490. The external source of hydrogen may supplement the hydrogen gas generated in redox flow battery system 400. For example, when gas leaks are detected in redox flow battery system 400 or when the reduction reaction rate is too low at low hydrogen partial pressure, an external source of hydrogen gas may be supplied in order to maintain pH and stability of the electrolytes. As an example, controller 80 may supply hydrogen gas from external source 490 in response to a measured change in pH or in response to a measured change in the state of charge of an electrolyte or an electro-active species. For example, an increase in pH of the negative electrolyte source, or the negative electrode compartment respectively, may indicate that hydrogen is leaking from the redox flow battery system 400 or the reaction rate is too slow with the available hydrogen partial pressure. Controller 80, in response to the pH increase, may increase a supply of hydrogen gas from external source 490 to the redox flow battery system 400. As a further example, controller 80 may supply hydrogen gas from external source 490 in response to a pH change, wherein the pH increases beyond a threshold pH or decreases beyond threshold pH.

For example, a first threshold pH for the negative electrolyte (e.g., plating electrolyte in an IFB) may be 4 and a second threshold pH for the negative electrolyte may be 3. In other words, if the pH for the negative electrolyte (e.g., redox electrolyte in an IFB) is measured beyond a first range (e.g., less than 3 or greater than 4), then controller 80 may adjust (e.g., increase or decrease, shut off, etc.) the external hydrogen gas supply rate to return the pH to the first range. For example, if the pH of the negative electrolyte is greater than 4, then controller 80 may increase the external gas supply rate to supply additional hydrogen, which with an applied electrical load will reduce ferric ions and produce protons, thereby reducing the redox electrolyte pH. In this manner, the pH of the negative electrolyte may be maintained within the stable region from 3-4, thus reducing the rates of reactions (3) and (4), while also reducing the risk of the $Fe(OH)_3$ precipitation formation from the ferric ions crossover from the positive electrode compartment. Other control schemes for controlling the supply rate of hydrogen gas from external source 490 responsive to a pH change or a change in a state of charge, detected by other sensors, such as an ORP meter or an optical sensor, of an electrolyte (e.g., the positive electrolyte or the negative electrolyte, or a combination thereof) may be implemented. Further still, the change in pH or state of charge triggering the action of controller 80 may be based on a rate of change or a change measured over a time period. The time period for the rate of change may be predetermined or adjusted based on the time constants for the redox flow battery system. For example, the time period may be reduced if the recirculation rate is high, and local changes in concentration (e.g., due to side reactions or gas leaks) may quickly be measured since the time constants may be small.

Electrochemical cells 410 and 412 may be coupled to one or more electrical loads, such as electrical loads 491 and 492. Electrical loads 491 and 492, herein also referred to as external loads, may be configured to supply current to electrochemical cells 410 and 412, respectively, upon control signals received from controller 80. By driving current to the electrochemical cells, the equilibrium of equations (7) and (8) can be shifted, thereby producing $H^+$, reducing electrolyte pH, and $Fe(OH)_3$ concentration. A first electrical load 492 may be coupled to the positive electrochemical cell and a second electrical load 491 may be coupled to the negative electrochemical cell.

Any residual current delivered from external loads 491 and 492, and/or any voltage generated at electrochemical cells 410 and 412 may be conserved within the IFB system. For example, a load may be pushed back to the system power bus (e.g. the main D.C. bus). The stored load may then be used to power other system components, thereby improving the overall system efficiency.

Thus, the system for a hybrid flow battery described above comprises a first electrochemical cell, herein also referred to as the positive electrochemical cell, and a second electrochemical cell, herein also referred to as the negative electrochemical cell. The positive electrochemical cell may be coupled between an outlet of a positive electrode compartment and a positive electrolyte source containing a positive electrolyte. A first electrical load may be coupled to the positive electrochemical cell. The negative electrochemical cell may be coupled between an outlet of a negative electrode compartment and a negative electrolyte source containing a negative electrolyte. A second load may be coupled to the negative electrochemical cell.

Figure 6:
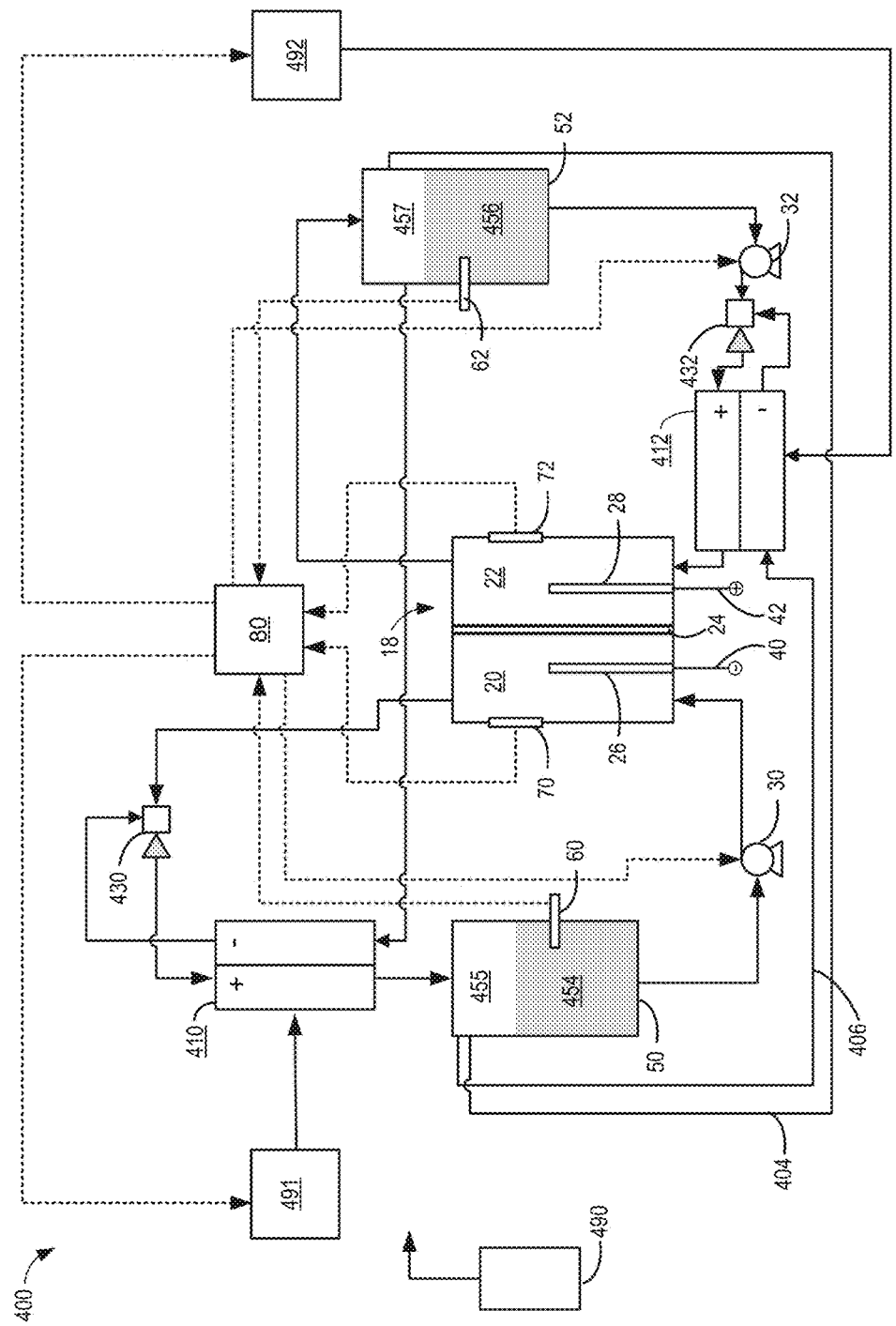
FIG. 6 is a schematic showing another example apparatus for the proposed electrochemical system in a redox flow battery system.

FIG. 6 illustrates another embodiment of a redox flow battery system comprising a redox flow battery cell as described in FIG. 5. In FIG. 6, a schematic for an example redox flow battery system 400 comprising a redox flow battery cell is illustrated. FIG. 6 includes some of the same elements as the redox flow battery system shown in FIGS. 1 and 5. Elements in FIG. 6 that are the same as elements in FIGS. 1 and 5 are labeled with the same numeric identifiers. As such, the description of elements in FIGS. 1 and 5 applies to the elements in FIG. 6 that have the same numerical identifiers. The differences between FIG. 5 and FIG. 6 will now be explained.

FIG. 6 shows an alternate positioning for the electrochemical cells 410 and 412. As illustrated in FIG. 6, electrochemical cell 410 may be coupled directly to the outlet of the negative electrode compartment via an eductor and coupled directly to the inlet of the negative electrolyte source. Further, electrochemical cell 412 may be coupled directly to the inlet of the positive electrode compartment, with no other components positioned there between, and coupled to the outlet of the positive electrolyte source.

As described above, the function of the electrochemical cell connected with the positive electrode compartment is to keep the pH of the positive electrolyte within the battery below a threshold set-point. Keeping the positive electrolyte below a threshold pH prevents $Fe(OH)_3$ from precipitating out of solution in the positive electrolyte. During battery charge, ionic migration in the electrolyte drives a significant amount of $H^+$ from the positive to the negative side of the battery wherein the $H^+$ may be consumed by side reactions (3) and (4). During battery discharge, ionic migration drives proton back from negative to positive electrolytes. As a result, during battery charge, positive electrolyte pH rises, and during battery discharge, pH decreases but a lesser amount of $H^+$ returns from the negative to the positive side of the battery. Thus, cycle by cycle, without active pH management described in this invention, the positive electrolyte pH may continuously increase due to loss of $H^+$. By placing the electrochemical cell as illustrated in FIG. 6 at the inlet of the positive side, the pH of the positive electrolyte in the battery may be maintained at a pH below the threshold level. Thus, the positive electrolyte may include a positive flow pathway wherein flowing the positive electrolyte include starting from the positive electrolyte source 52 to the pump 32, from the pump 32 to the educator 432 (to pull hydrogen rich gas from head space 455 through line 406 for electrochemical cell 412), from the eductor 432 to a cathode of the positive electrochemical cell, from the cathode of positive electrochemical cell directly to the positive electrode compartment 28, and from the positive electrode compartment 28 to the positive electrolyte source without passing through any other components along the positive flow pathway. In this example, the positive flow pathway may only flow the positive electrolyte in the order provided. In this way, the positive electrolyte may be treated by the positive electrochemical cell before passing directly into the positive electrode compartment, without flowing through any other components.

As described previously, on the negative side of the battery, $Fe^{2+}$ becomes $Fe^0$ during charge with the reverse occurring during discharge. As a result of the side reactions (3) and (4), the negative electrolyte pH may stabilize at a value above 3. $Fe^{2+}$ is stable in this pH range, but, due to ionic movements, some amount of $Fe^{3+}$ crosses over from the positive to the negative side of the battery during charge. By positioning the negative electrochemical cell as illustrated in FIG. 6 at the outlet of the negative side, any crossed-over Ferric ions may be converted to ferrous ions immediately, which is stable in the pH 3-4 range as shown in FIG. 3. Thus, the negative electrolyte may include a negative flow pathway wherein the negative electrolyte flows starting from the negative electrode compartment 20 directly to a cathode of a second electrochemical cell 430 via an eductor 430 (to pull hydrogen rich gas from head space 457 through line 408 for electrochemical cell 410) to a negative electrolyte source 454 to the pump 30 and from the pump 30 back to the negative electrode compartment 20, thus completing a negative electrolyte flow pathway. The negative electrolyte flows without passing through any other components along the negative flow pathway in the order as described above. In this example, the negative flow pathway may only flow the negative electrolyte in that order. In this way, the negative electrolyte may be flowed directly from the eductor which passes the negative electrolyte from the negative electrode compartment to the negative electrochemical cell to be treated, without flowing through any other components.

The redox flow battery systems comprising electrochemical cells described in FIGS. 5 and 6 above illustrate an electrochemical cell coupled to both the negative electrode compartment and positive electrode compartment. In other embodiments, the electrochemical cells may be coupled with battery 18 in parallel electrolyte paths. In yet other embodiments, the redox flow battery system may comprise an electrochemical cell coupled to the negative electrode compartment and no electrochemical cell coupled to the positive electrode compartment. In yet other embodiments, the redox flow battery system may comprise an electrochemical cell coupled to the positive electrode compartment and no electrochemical cell coupled to the negative electrode compartment. Thus, multiple arrangements of one or more electrochemical cells, e.g. rebalancing cells, may be possible in redox flow battery systems.

Figure 7:
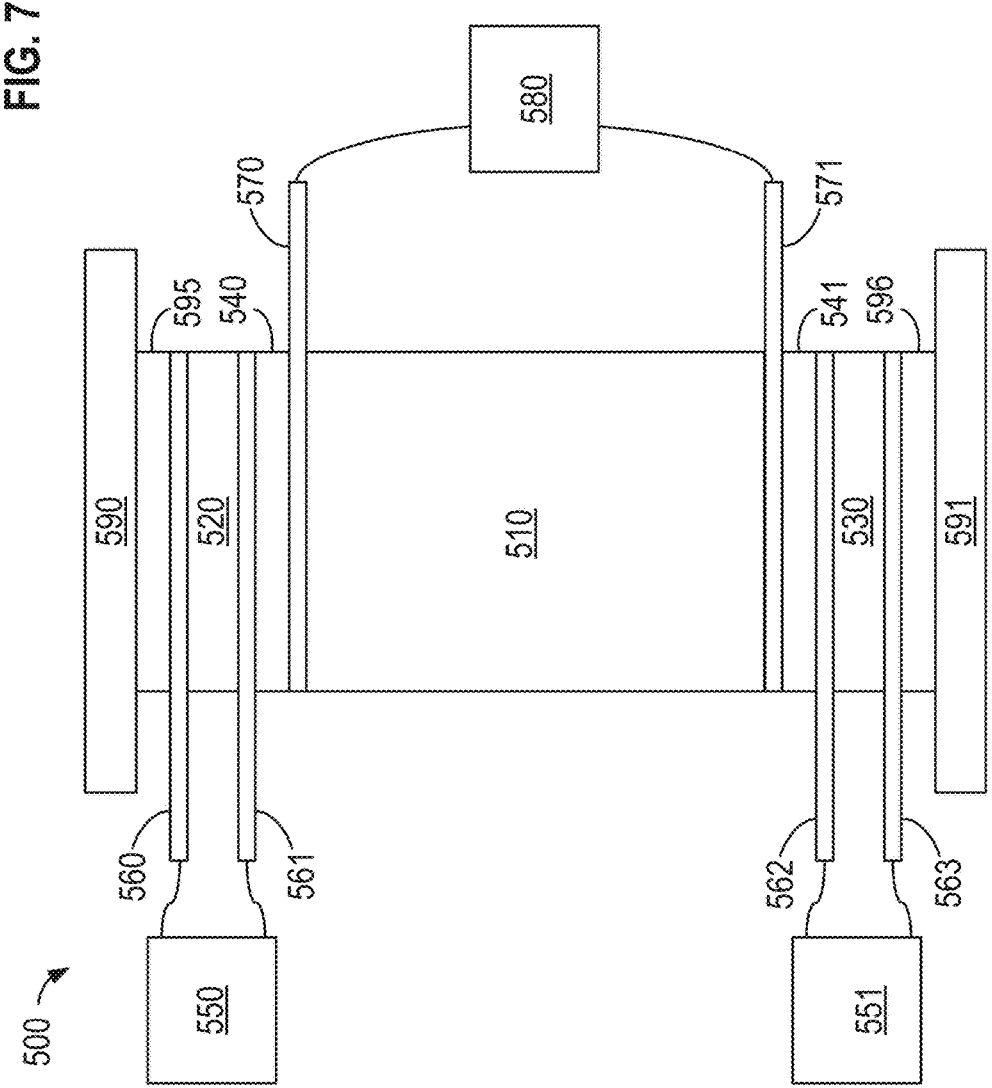
FIG. 7 is a schematic showing yet another embodiment applying the proposed electrochemical system in a redox flow battery system.

FIG. 7 illustrates another embodiment of a redox battery system 500 comprising positive and negative electrochemical cells. Unlike the embodiment shown in FIGS. 5 and 6, where electrochemical cells are external to the IFB battery, redox battery system 500 comprises an IFB battery 510 including a positive electrochemical cell 520 and a negative electrochemical cell 530 disposed within IFB battery 510.

A redox flow battery system may comprise a plurality of cells stacked in series or in parallel. As shown in FIG. 7, positive electrochemical cell 520 and negative electrochemical cell 530 are built within the same power module as IFB battery 510, but are electrically separated via insulators 540 and 541. Portions of the positive and negative electrolytes are directed to the positive and negative electrochemical cells, respectively. The amount of electrolyte bypassed to the electrochemical cells may be controlled by pressure drops through these cells relative to the IFB battery. $H_2$, either generated from the negative side of the IFB battery or from the external Hydrogen source, is directed to anodes of the positive and negative electrochemical cells, as illustrated in FIGS. 5 and 6. External loads 550 and 551, for example system auxiliary components, are used to control currents passing through these electrochemical cells based on electrolyte pH via current collectors 560, 561, 562, and 563. In this way, an electrical current may be applied to the positive or negative electrochemical cell in order to induce the production of $H^+$ ions, thereby lowering the pH of the electrolyte contained within the electrochemical cell. Additional current collectors 570 and 571 may couple the battery to a customer load 580. Pressure plates 590 and 591 may be coupled externally to positive electrochemical cell 520 and negative electrochemical cell 530, respectively. The pressure plates may be separated from the electrochemical cells via insulators 595 and 596.

As described above in FIGS. 5, 6 and 7, a system for a hybrid flow battery may be provided. The redox cell may comprise a negative electrode compartment, a positive electrode compartment, and a membrane separator disposed between the negative electrode compartment and the positive electrode compartment. The positive electrode compartment may be coupled to a positive electrolyte source containing a positive electrolyte. Similarly, the negative electrode compartment may be coupled with a negative electrolyte source containing a negative electrolyte.

A positive electrochemical cell, also referred to as a positive rebalancing cell, may be coupled between the inlet of the positive electrode compartment and the positive electrolyte source containing a positive electrolyte. A negative electrochemical cell, also referred to as a negative rebalancing cell, may be coupled between the outlet of the negative electrode compartment and the negative electrolyte source containing a negative electrolyte. The redox cell may further include a first electrical load coupled to the positive electrochemical cell and a second electrical load coupled to the negative electrochemical cell. A controller may be configured with instructions stored in non-transitory memory for the operation of the redox cell, including operating instructions for the positive electrochemical cell and the negative electrochemical cell. For example, the controller may be configured to apply the first electrical load to the positive electrochemical cell based on a pH of the positive electrolyte being above a first threshold and the ionic movement directions during battery charge and discharge, and apply the second electrical load to the negative electrochemical cell based on a pH of the negative electrolyte being above a second threshold and the state of battery operations. Further, the controller may discontinue the first electrical load to the positive electrochemical cell when a pH of the positive electrolyte being below a third threshold and discontinue the second electrical load to the negative electrochemical cell when a pH of the negative electrolyte is below a fourth threshold.

The redox flow battery systems comprising electrochemical cells described in FIGS. 5, 6 and 7 above illustrate an electrochemical cell coupled to both the negative electrode compartment and positive electrode compartment. The electrochemical cell may be positioned external to the battery in-line or in parallel, or within the battery compartments. In other embodiments, the redox flow battery system may comprise an electrochemical cell coupled to the negative electrode compartment and no electrochemical cell coupled to the positive electrode compartment. In yet other embodiments, the redox flow battery system may comprise an electrochemical cell coupled to the positive electrode compartment and no electrochemical cell coupled to the negative electrode compartment. Thus, multiple arrangements of one or more electrochemical cells, e.g. rebalancing cells, may be possible in redox flow battery systems.

Figure 8:
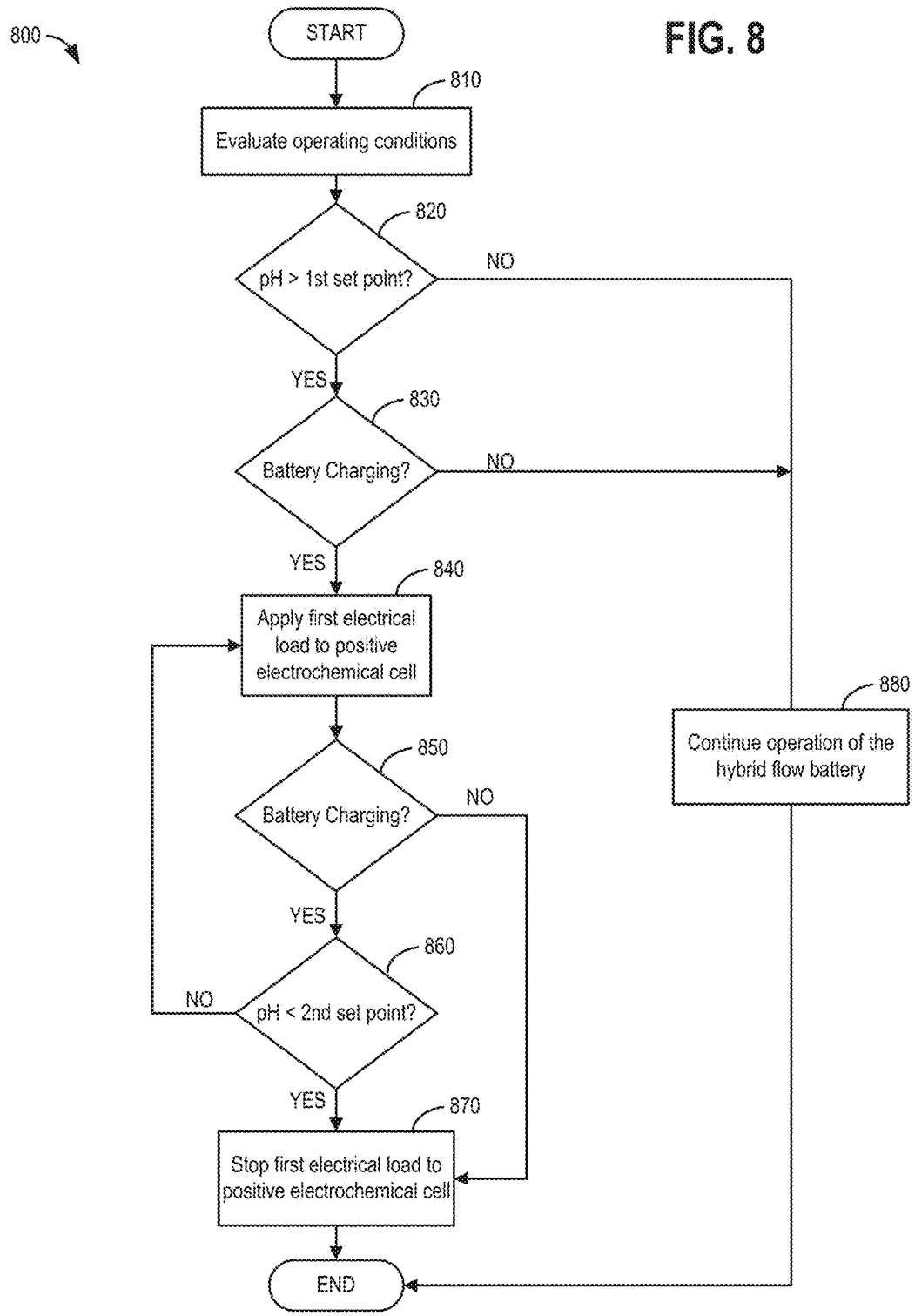
FIG. 8 is a flow chart for an example method of rebalancing electrolytes in a redox flow battery system.
Figure 9:
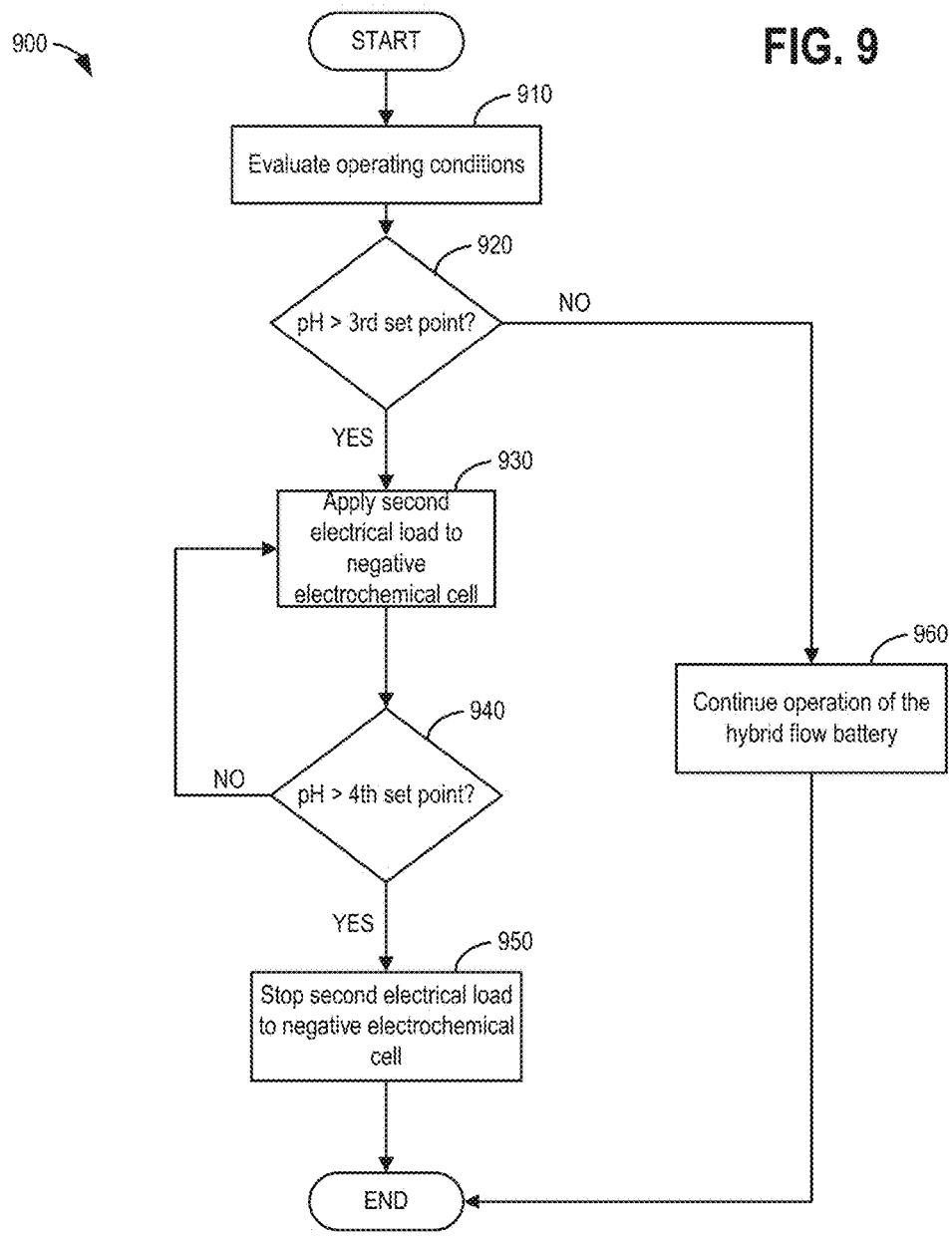
FIG. 9 is a flow chart for an example method of rebalancing electrolytes in a redox flow battery system.

Regarding FIGS. 8 and 9, example methods are outlined for maintaining the stability of an electrolyte in a hybrid flow battery. For example, the hybrid flow battery may be an all-iron hybrid flow battery. The methods may comprise applying an electrical load to at least one electrochemical cell based on the pH of an electrolyte, as outlined below. While the electrical load is applied, the electrochemical cells produce $H^+$, as discussed at FIG. 4, to maintain the pH of the electrolyte to be within a desired range.

Turning now to FIG. 8, a high-level flowchart is shown illustrating example method 800 of maintaining the stability of the positive electrolytes in a hybrid flow battery system. The method may maintain the pH of the positive electrolytes to within a specified range. In one embodiment, the method may include applying a first electrical load to a positive electrochemical cell based on a pH of an electrolyte. The method may operate electrochemical cells arranged in a hybrid flow battery system as described in FIGS. 5, 6, and 7 above. In the example method shown, the positive electrochemical call may be shorted, e.g., apply electrical load, during the charge cycle.

Method 800 begins at 810, where redox flow battery system operating conditions may be evaluated. As an example, at 810, electrolyte chemical properties including pH, battery state of charge, electrolyte reactant ionic concentrations, electrolyte state of charge, and the like may be measured using various sensors and/or probes (e.g., sensors 60, 62, 70, 72, as described herein and depicted in FIGS. 1, 5, and 6). As an example, the battery state of charge may be determined using an ORP probe, and the pH may be measured using a pH meter, and electrolyte reactant ionic concentration may be monitored using an ORP probe for measuring electrolyte potential. In another example, whether the battery is in a charge or a discharge state may be determined by current flow direction.

Continuing at 820, method 800 may include determining whether the pH of the electrolyte is greater than a 1st set point. In one example, the method may include determining if the pH of the positive electrolyte is greater than a 1st set point. For example, the pH of the positive electrolyte may be ascertained by sensors 62 and 72. For example, for an all-iron redox battery, IFB, described herein, the positive electrolyte may have a 1st set point in a range of pH 1-1.8.

If the positive electrolyte has a pH that is not greater than the 1st set point, method 800 may proceed to 880. At 880, method 800 may include operating the hybrid flow battery in a normal manner Method 800 may then end.

If at 820 the positive electrolyte has a pH that is greater than the 1st set point, method 800 may proceed to 830 and determine if the battery is charging. If no, the battery is not charging, the method may proceed to 880 and continue operating in a normal manner and then end. If yes, the battery is charging, the method may proceed to 840.

Continuing at 840, the method may apply a first electrical load to the positive electrochemical cell. In this example, the electrical load is applied when the pH of the positive electrolyte is greater than the 1st set point and during a charge cycle of the redox flow battery, for example an all-iron redox flow battery. Applying the first electrical load to the positive electrochemical cell produces $H^+$ in the electrochemical cell to maintain the pH of the electrolyte within a desired range. The method may then proceed to 850 and determine if the battery is charging. If no, the battery is not charging, the method may proceed to 870 and stop the first electrical load to the positive electrochemical cell.

If yes, the battery is charging, the method may proceed to 860 and determine if the pH is below a 2nd set point. For example, the 2nd set point may be a pH less than 2. In another example, the 2nd set point may be a pH less than or equal to 1. If no, the pH is not below a 2nd set point, the method may return to 840 and continue to apply the first electrical load to the positive electrochemical cell. If yes, the pH is below a 2nd set point, the method may then proceed to 870. At 870, the method may include stopping the first electrical load to the positive electrochemical cell responsive to the positive electrolyte pH being lower than a 2nd set point pH. The method may then end. Thus, FIG. 8 provides a method for maintaining the stability of an electrolyte in a hybrid flow battery. For example, the pH of the positive electrolyte may be maintained within a desired pH range wherein the desired pH range may be less than 2. In another example, the desired pH range may be less than or equal to 1.

Turning now to FIG. 9, another high-level flowchart is shown illustrating example method 900 of maintaining the stability of the electrolytes in a hybrid flow battery system. The method may maintain the pH of the negative electrolytes to within a specified range. In one embodiment, the method may include applying a second electrical load to a negative electrochemical cell based on a pH of an electrolyte. The method may operate the negative electrochemical cell arranged in a hybrid flow battery system as described in FIGS. 5, 6, and 7 above.

Method 900 begins at 910, where redox flow battery system operating conditions may be evaluated. As an example, at 910, electrolyte chemical properties including pH, battery state of charge, electrolyte reactant ionic concentrations, electrolyte state of charge, and the like may be measured using various sensors and/or probes (e.g., sensors 60, 62, 70, 72, as described herein and depicted in FIGS. 1, 5, and 6).

Continuing at 920, method 900 may include determining whether the pH of the negative electrolyte is greater than a 3rd set point. In one example, the method may include determining if the pH of the negative electrolyte is greater than a 3rd set point. For example, the pH of the negative electrolyte may be ascertained by sensors 60 and 70. For example, for an all-iron redox battery, IFB, described herein, the negative electrolyte may have a 3rd set point within a range of pH 3.5-4.5. As another example range, the 3rd set point may be within a range of pH 3.5-4.2.

In some examples, the negative side of the IFB system may always be maintained in a shorted condition. In other words, the stability of an electrolyte in a hybrid flow battery may be maintained through the illustrated method comprising applying an electrical load to an electrochemical cell based on a pH of an electrolyte. In other examples, the negative side of the IFB system may be maintained in a shorted condition during the discharge cycle.

If the negative electrolyte pH is not greater than the 3rd set point, method 900 may proceed to 960. At 960, method 900 may include continuing operating the hybrid flow battery in a normal manner. Method 900 may then end.

If yes at 920, the method determines the pH of the negative electrolyte is greater than a 3rd set point, the method may proceed to 930 and apply a second electrical load to the negative electrochemical cell based on the electrolyte pH. A second electrical load may be provided by an external system load, such as external system loads 550 and 551, as described herein and shown in FIG. 7. For example, the method may apply a second electrical load to the negative electrochemical cell based on the pH of the negative electrolyte. In this way, applying an electrical load to the negative electrochemical cell may reduce crossed-over $Fe^{3+}$ to $Fe^{2+}$ while inducing the formation of H+ ions, thereby decreasing the pH of the electrolyte contained therein.

Continuing at 940, method 900 may include determining whether the pH of the negative electrolyte is less than a 4th set point. For example, for the all-iron IFB described herein, the negative electrolyte may have a 4th set point in the range of pH 2.8-3.5. If the pH of the electrolyte is not less than the respective 4th set point, method 900 may return to 930 and continue applying a second electrical load to the negative electrochemical cell. If the pH of the electrolyte is less than the respective 4th set point, method 600 may proceed to 950. At 950, the method may include stopping the second electrical load to the negative electrochemical cell responsive to the negative electrolyte pH being lower than a 4th set point pH. For example, the electrical load may be turned off when the pH of the electrolyte is lower than the 4th set point. In some examples, the electrical load for the positive electrochemical cell may be applied during battery charge only and the electrical load for the negative electrochemical cell may be applied during battery charge or discharge. The method 900 may then end. Thus, FIG. 9 provides a method for maintaining the stability of an electrolyte in a hybrid flow battery. For example, the pH of the negative electrolyte may be maintained within a desired pH range wherein the desired pH range, in some embodiments, may be 3.0 to 4.0.

The example methods illustrated in FIGS. 8 and 9 may be used to maintain the stability of the electrolyte in a redox flow battery system, for example an all-iron redox flow battery system. The example methods illustrated may be run concurrently to maintain the positive electrolyte pH and the negative electrolyte pH. In other embodiments, other variations of the example methods are possible. For example, if only a first electrochemical cell is provided in a hybrid flow battery system, method 800 may be used.

As will be appreciated by one of ordinary skill in the art, the methods depicted in FIGS. 8 and 9 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

Figure 10:
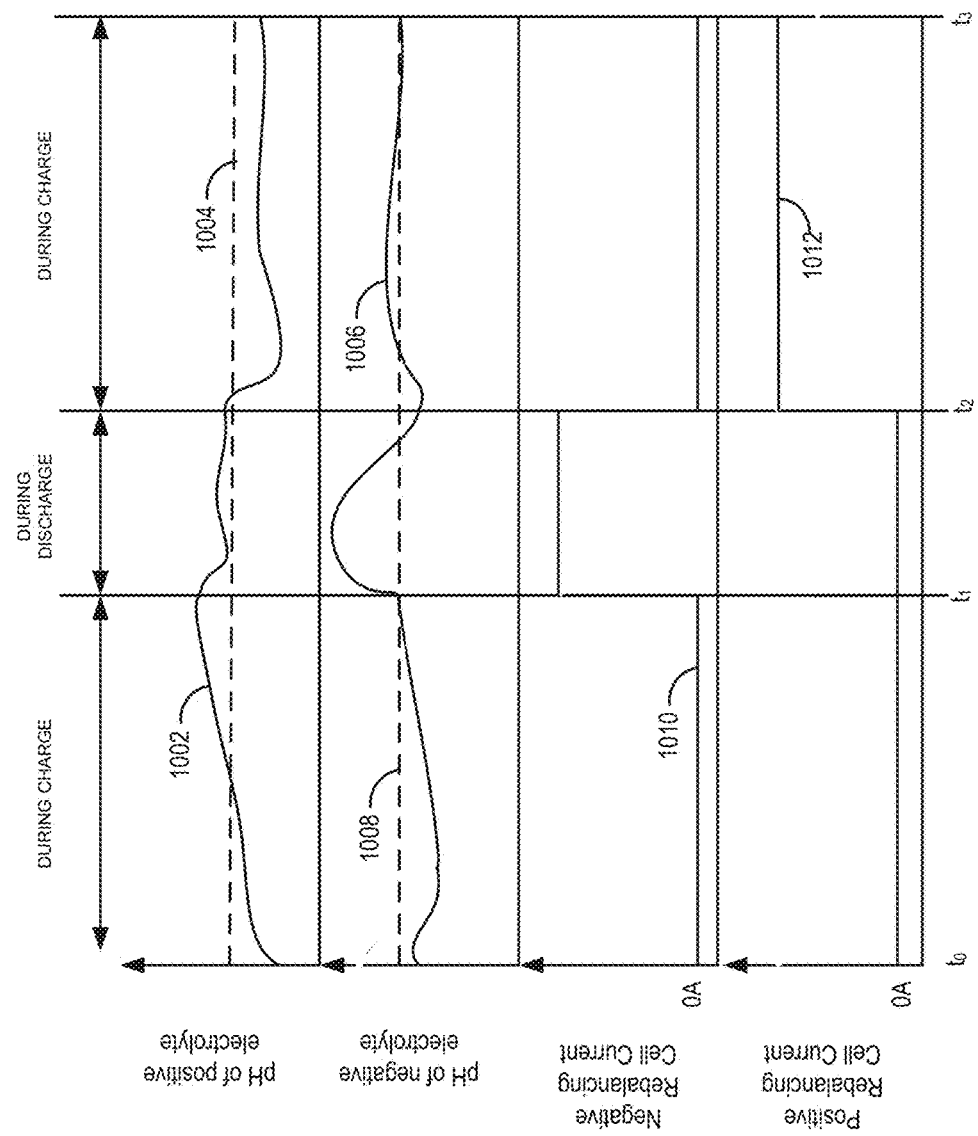
FIG. 10 is a chart of an example use of the proposed electrochemical system in a redox battery.

Turning to FIG. 10, a chart is provided as an example of the use of the proposed electrochemical system in a redox battery. In FIG. 10, the ionic movements in an IFB battery are further illustrated in an operating IFB battery where the pH of the positive electrolyte 1002, the pH of the negative electrolyte 1006, the positive rebalancing cell current 1012, and the negative rebalancing cell current 1010 is plotted. The plots in FIG. 10 illustrate the pH of the corresponding electrode compartment and the effect the rebalancing cell may have on maintaining the stability of the electrolyte pH in a hybrid flow battery. The description below includes examples from an IFB battery. It should be noted that rebalancing cells as disclosed may be used in other redox flow battery systems.

As shown during charge from $t_0$ to $t_1$, the IFB redox flow battery operation with no use of the rebalancing cells, also referred to as the electrochemical cells, is shown. During charge, on the positive side of the IFB battery, the $Fe^{2+}$ is oxidized to form $Fe^{3+}$. From the Pourbaix diagram discussed at FIG. 3, it may be seen that as more $Fe^{2+}$ ions are oxidized, the electrolyte on the positive side of the IFB battery tends to stabilize at a pH range close to 1. However, during battery charge, ionic migration drives significant amounts of $H^+$ from the positive side to the negative side of the battery, resulting in an increase in the pH of the positive electrolyte. The increase in pH in the positive electrode compartment may lead to the $Fe^{3+}$ ion precipitating and clogging the positive electrode when the pH of the electrolyte is above a first threshold 1004. This may decrease the efficiency of the overall battery and may further lead to catastrophic battery failures.

During charge from $t_0$ to $t_1$, on the negative side of the IFB battery, the $Fe^{2+}$ accepts two electrons to form $Fe^0$. On the negative side, a competing reaction for the electrons is present. The $H^+$ which migrates from the positive side may accept one electron to form $H_2$. As a result, the electrolyte on the negative side of the battery tends to stabilize in a pH range of 3 to 6. However, during battery charge, ionic migration causes some of the $Fe^{3+}$ to crossover from the positive side to the negative side of the battery. The $Fe^{3+}$ present may precipitate at pH levels greater than a second threshold value 1008 and coat components present in the negative electrode compartment and reduce the efficiency of the battery.

As shown during discharge from $t_1$ to $t_2$, the IFB redox flow battery is operated with the negative rebalancing cell having a current 1010 applied. As illustrated in FIGS. 5 and 6, the negative electrolyte is pumped through the negative electrode compartment and the negative rebalancing cell. A current is applied to the negative rebalancing cell during discharge to take care of any $Fe^{3+}$ that crosses over from the positive electrode compartment. Thus, the negative rebalancing cell reduces the $Fe^{3+}$ ion from the negative electrolyte to $Fe^{2+}$ which is stable within the negative electrolyte pH range and produces $H^+$ to maintain the pH of the negative electrolyte. It should be noted that the negative rebalancing cell may also be on during redox flow battery charge to take care of any $Fe^{3+}$ that crosses over from the positive electrode compartment.

As shown during charge from $t_2$ to $t_3$, the IFB redox flow battery is operated with the positive rebalancing cell having a current 1012 applied. As illustrated in FIGS. 5 and 6, the positive electrolyte is pumped through the positive rebalancing cell and then the positive electrode compartment. A current is applied to the positive rebalancing cell during battery charge to generate $H^+$ and maintain electrolyte pH to avoid $Fe^{3+}$ from precipitation. As discussed above, the $Fe^{3+}$ may precipitate in positive electrolyte as the pH of the electrolyte increases. During charge, the pH of the positive electrolyte increases due to the migration of the $H^+$ ions to the negative side. Thus, the positive rebalancing cell keeps positive electrolyte pH within a desired range so that $Fe^{3+}$ from the positive electrolyte does not precipitate.

As described above, a method for maintaining the stability of an electrolyte in a hybrid flow battery is provided including applying an electrical load to at least one electrochemical cell based on a pH of an electrolyte and producing $H^+$ in the electrochemical cell to maintain the pH of the electrolyte within a desired range, wherein the electrochemical cell is a positive electrochemical cell coupled to a positive electrode compartment either in line or in parallel. The method may further include supplying the supplying the electrolyte to a cathode of the at least one electrochemical cell and supplying hydrogen gas to an anode of the at least one electrochemical cell. In some examples, the negative electrochemical cell may be coupled to a negative electrode compartment either in line or in parallel. Further, in some examples, current pulled through the application of an electrical load to the electrochemical cell may be used to power auxiliary components in the overall IFB system. In some examples, the electrical load may be applied when the pH of a positive electrolyte is greater than a 1st set point. In these or other examples, the electrical load may be applied when the pH of a negative electrolyte is greater than a 3rd set point.

As another non-limiting example, a method for maintaining the stability of an electrolyte in an all-iron redox flow battery is disclosed. The method may include flowing a positive electrolyte to a cathode of a first electrochemical cell, flowing a negative electrolyte to a cathode of a second electrochemical cell, supplying hydrogen gas from a head space of an electrolyte source to an anode of the first electrochemical cell and an anode of the second electrochemical cell via educators or pumps, applying a first electrical load to the first electrochemical cell responsive to electrolyte pH set points, and applying a second electrical load to the second electrochemical cell responsive to electrolyte pH set points. In some examples, the method may further include applying the first electrical load during a charge cycle of the all-iron redox flow battery. Moreover, the method may include stopping the first electrical load responsive to the positive electrolyte pH lower than a 2nd set point pH, and stopping the second electrical load responsive to the negative electrolyte pH lower than a 4th set point pH.

As another example, a system for a hybrid flow battery is disclosed including a positive electrochemical cell coupled in line or in parallel of a positive electrode compartment, a first electrical load coupled to the positive electrochemical cell, a negative electrochemical cell coupled in line or in parallel of a negative electrode compartment, a second electrical load coupled to the negative electrochemical cell and where hydrogen-rich gas circulates between headspaces of positive and negative electrolyte sources to anodes of negative and positive electrochemical cells. The system may further include a controller configured with instructions stored in non-transitory memory, that when executed, may cause the controller to apply the first electrical load to the positive electrochemical cell based on electrolyte first electrolyte pH set points and apply the second electrical load to the negative electrochemical cell based on a second electrolyte pH set points. As another example, in some systems, the positive electrochemical cell and the negative electrochemical cell may be positioned external to the battery or within the battery compartments. As a further example, the positive electrochemical cell may be coupled directly to an inlet of the positive electrode compartment and the negative electrochemical cell may be coupled directly to an outlet of the negative electrode compartment.

As another example, a system for a hybrid flow battery is disclosed including a redox cell having a negative electrode compartment, a positive electrode compartment, and a membrane separator disposed between the negative electrode compartment and the positive electrode compartment. The system may further include a positive electrolyte source coupled to the positive electrode compartment and containing a positive electrolyte, a positive electrochemical cell coupled in line or in parallel of the positive electrode compartment and the positive electrolyte source, a negative electrolyte source coupled to the negative electrode compartment and containing a negative electrolyte, a negative electrochemical cell coupled in line or in parallel of the negative electrode compartment and the negative electrolyte source, a pressure equalization line between a head space of the positive electrolyte source and the negative electrolyte source, a line connecting the head space of the electrolyte sources to the electrochemical cells via eductors or pumps to circulate hydrogen rich gas, a first electrical load coupled to the positive electrochemical cell, a second electrical load coupled to the negative electrochemical cell, a controller configured with instructions stored in non-transitory memory, that when executed, cause the controller to apply the first electrical load to the positive electrochemical cell when a first electrolyte pH set points are met and to apply the second electrical load to the negative electrochemical cell when a second electrolyte pH set points are met. The system further may include discontinuing the first electrical load to the positive electrochemical cell when a first electrolyte pH is below a third threshold. As another example, may include discontinuing the second electrical load to the negative electrochemical cell when a second electrolyte pH is below a fourth threshold. As another example, the system also may include at least one eductor coupled to the positive and/or negative electrochemical cells wherein the eductor delivers hydrogen gas via the line.

It will also be appreciated that the configurations and routines disclosed herein are exemplary in nature, and that these specific embodiments are not to be considered in a limiting sense, because numerous variations are possible. For example, the above technology may be applied to other flow battery types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

This concludes the description. The reading of it by those skilled in the art would bring to mind many alterations and modifications without departing from the spirit and the scope of the description. For example, hybrid redox flow battery systems, all-iron hybrid redox flow battery systems, and other redox flow battery systems may all take advantage of the present description.

The invention claimed is:

1. A method for maintaining stability of an electrolyte in a hybrid flow battery, comprising:
    while the hybrid flow battery is charging:
        supplying an electrical current to at least one electrochemical cell based on a pH of an electrolyte; and
        producing $H^+$ in the electrochemical cell to maintain the pH of the electrolyte within a desired range, wherein an equilibrium of production of the $H^+$ changes as the electrical current changes;
    wherein the electrochemical cell is a positive electrochemical cell coupled to a positive electrode compartment either in line or in parallel.

2. The method of claim 1, further comprising:
    supplying the electrolyte to a cathode of the at least one electrochemical cell; and
    supplying hydrogen gas to an anode of the at least one electrochemical cell.

3. The method of claim 1, further comprising a negative electrochemical cell coupled to a negative electrode compartment either in line or in parallel.

4. The method of claim 1, where the electrical current is delivered from external loads, and wherein a residual current of the electrical current is used to power auxiliary components in an overall IFB system.

5. The method of claim 1, wherein the electrical current is supplied when a pH of a positive electrolyte is greater than a first set point.

6. The method of claim 5, wherein, for an all-iron redox battery, the first set point of the pH of the positive electrolyte is in a range of pH 1 to 1.8.

7. The method of claim 1, wherein the electrical load is applied when a pH of a negative electrolyte is greater than a third set point.

8. The method of claim 7, wherein, for an all-iron redox battery, the third set point of the pH of the negative electrolyte is in a range of pH 3.5 to 4.5.

9. The method of claim 1, further comprising stopping the electrical current based on the pH of the electrolyte.

10. The method of claim 9, wherein the electrical current is turned off when a pH of a positive electrolyte is lower than a second set point or a pH of a negative electrolyte is lower than a fourth set point.

11. The method of claim 10, wherein the electrical current for the positive electrochemical cell is supplied during battery charge only and an electrical current for a negative electrochemical cell is applied during battery charge or discharge.

12. A method for maintaining stability of an electrolyte in an all-iron redox flow battery, comprising:
    flowing a positive electrolyte to a cathode of a first electrochemical cell;
    flowing a negative electrolyte to a cathode of a second electrochemical cell;
    supplying hydrogen gas from a head space of an electrolyte source to an anode of the first electrochemical cell and an anode of the second electrochemical cell via eductors or pumps;
    supplying a first electrical current to the first electrochemical cell responsive to electrolyte pH set points;
    supplying a second electrical current to the second electrochemical cell responsive to pH set points; and
    producing $H^+$ in the electrochemical cell to maintain the pH of the electrolyte within a desired range.

13. The method of claim 12, further comprising:
    applying the first electrical load during a charge cycle of the all-iron redox flow battery.

14. The method of claim 12, further comprising;
    stopping the first electrical current responsive to a positive electrolyte pH lower than a second set point; and
    stopping the second electrical current responsive to a negative electrolyte pH lower than a fourth set point.

* * * * *